(12) United States Patent
Numauchi

(10) Patent No.: US 11,358,386 B2
(45) Date of Patent: Jun. 14, 2022

(54) METHOD FOR MEASURING VARNISH FILM THICKNESS OF PRINTED ARTICLE AND VARNISH FILM THICKNESS MEASUREMENT DEVICE

(71) Applicant: KOMORI CORPORATION, Tokyo (JP)

(72) Inventor: Hiromitsu Numauchi, Tsukuba (JP)

(73) Assignee: KOMORI CORPORATION, Tokyo (JP)

( * ) Notice: Subject to any disclaimer, the term of this patent is extended or adjusted under 35 U.S.C. 154(b) by 187 days.

(21) Appl. No.: 16/336,332

(22) PCT Filed: Sep. 4, 2017

(86) PCT No.: PCT/JP2017/031708
§ 371 (c)(1),
(2) Date: Mar. 25, 2019

(87) PCT Pub. No.: WO2018/056029
PCT Pub. Date: Mar. 29, 2018

(65) Prior Publication Data
US 2019/0232639 A1 Aug. 1, 2019

(30) Foreign Application Priority Data
Sep. 26, 2016 (JP) .............................. JP2016-187109

(51) Int. Cl.
*B41F 33/00* (2006.01)
*B41M 7/02* (2006.01)
(Continued)

(52) U.S. Cl.
CPC ............... *B41F 33/00* (2013.01); *B41M 1/14* (2013.01); *B41M 3/14* (2013.01); *B41M 7/02* (2013.01); *G01B 11/0675* (2013.01)

(58) Field of Classification Search
CPC ........ B41F 33/00; B41F 11/02; B41F 19/001; B41F 33/0036; B41F 23/08; B41M 1/14;
(Continued)

(56) References Cited

U.S. PATENT DOCUMENTS 9,656,506 B1 * 5/2017 Reddy .................. G09F 3/10
2005/0019533 A1 1/2005 Mossbrook et al.
(Continued)

FOREIGN PATENT DOCUMENTS

CA   2 446 559 A1   11/2002
CN   103459976 A   12/2013
(Continued)

OTHER PUBLICATIONS

The Extended European Search Report dated Apr. 28, 2020, issued in the counterpart European patent application No. 17852808.9.
(Continued)

*Primary Examiner* — Leslie J Evanisko
*Assistant Examiner* — Leo T Hinze
(74) *Attorney, Agent, or Firm* — Birch, Stewart, Kolasch & Birch, LLP

(57) ABSTRACT

The present invention is a method for measuring the varnish film thickness of a printed article by obtaining the film thickness of varnish on a sheet (1) on which a pattern is printed on a base thereof with ink and the pattern is coated with the varnish, wherein a metal foil (1c) having a smooth surface is attached to the base of the sheet (1), and the film thickness of the varnish coated directly over the metal foil (1c) is detected with a spectral interference-type film thickness meter (81) so as to determine whether the film thickness of the varnish is acceptable or not on the basis of the results detected by the spectral interference-type film thickness meter (81).

12 Claims, 12 Drawing Sheets

(51) Int. Cl.
*B41M 3/14* (2006.01)
*B41M 1/14* (2006.01)
*G01B 11/06* (2006.01)

(58) Field of Classification Search
CPC ........ B41M 3/14; B41M 7/02; B41M 7/0045; B41M 7/0027; B41M 7/0036; B41M 7/0054; G01B 11/0675
See application file for complete search history.

(56) References Cited

U.S. PATENT DOCUMENTS

| | | |
|---|---|---|
| 2014/0022564 A1 | 1/2014 | Yamada et al. |
| 2015/0072117 A1 | 3/2015 | Demange et al. |

FOREIGN PATENT DOCUMENTS

| | | | |
|---|---|---|---|
| DE | 10236904 A1 | 2/2004 | |
| EP | 0115854 A2 | 8/1984 | |
| EP | 0186620 A2 | 7/1986 | |
| GB | 2172397 A | 9/1986 | |
| JP | 2003-211896 A | 7/2003 | |
| JP | 2007-118219 A | 5/2007 | |
| JP | 2009-613 A | 1/2009 | |
| JP | 2014-210438 A | 11/2014 | |
| JP | 2015-513485 A | 5/2015 | |
| WO | WO 02/094577 A1 | 11/2002 | |
| WO | WO 2009/060930 A1 | 5/2009 | |
| WO | WO 2013/127715 A2 | 9/2013 | |

OTHER PUBLICATIONS

Ji et al., "An On-line Accurate Measurement Method for Nano Film Thickness", Infrared (Monthly), Jul. 2011, vol. 32, No. 7, pp. 9-16 (8 pages with English abstract).

Chinese Office Action dated Jan. 25, 2021 in counterpart Chinese Patent Application No. 201780058603.9 with an English Translation.

Indian Office Action for Indian Application No. 201917010372, dated Dec. 27, 2021, with English translation.

\* cited by examiner

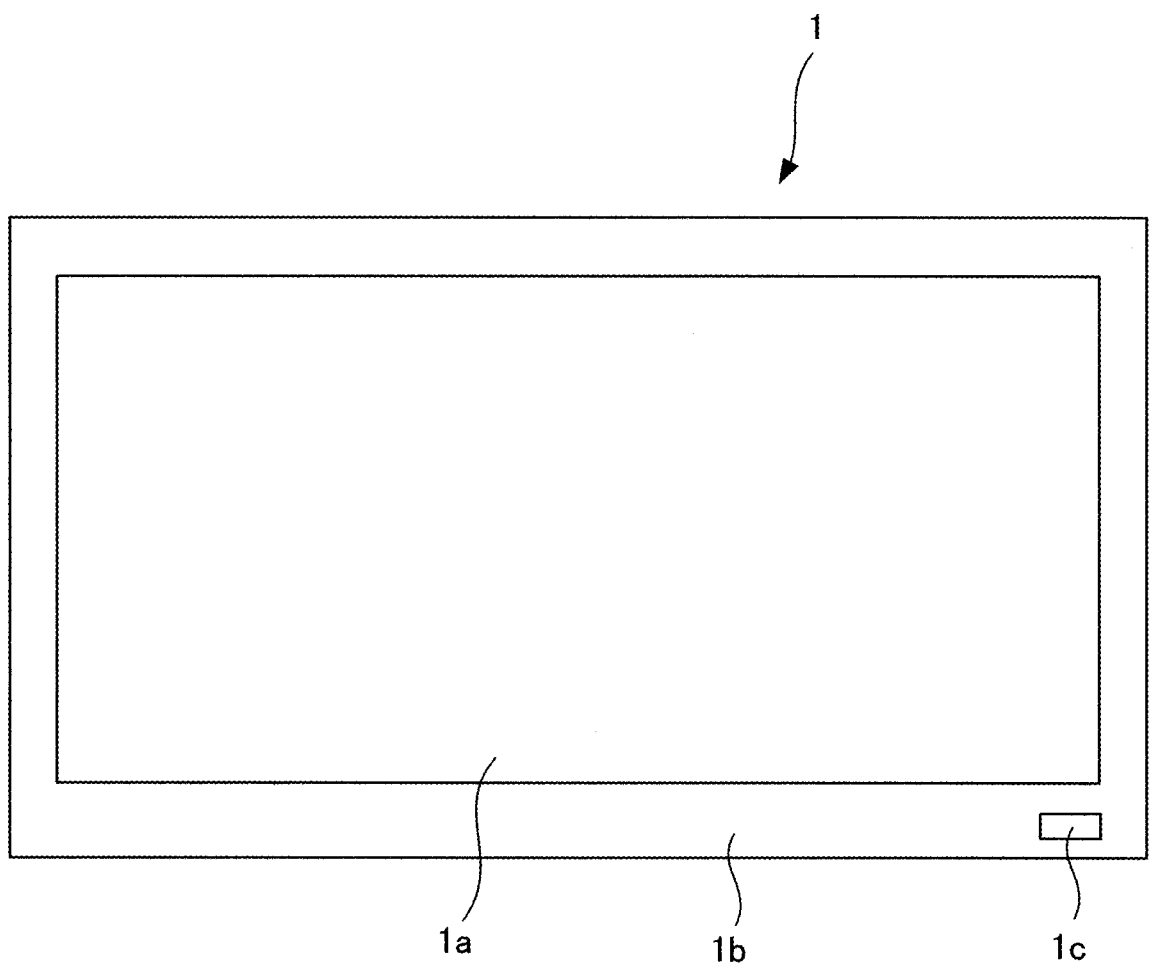

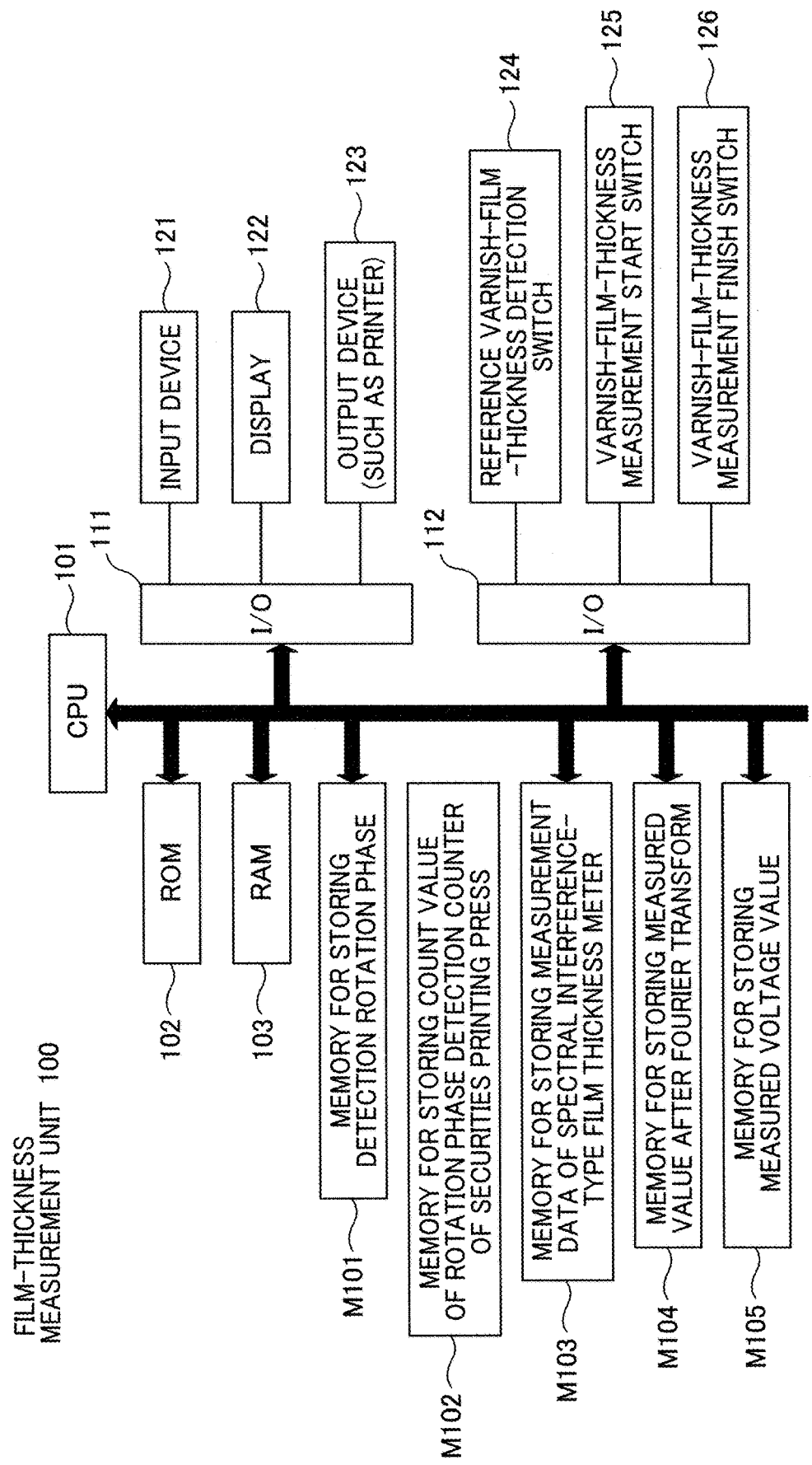

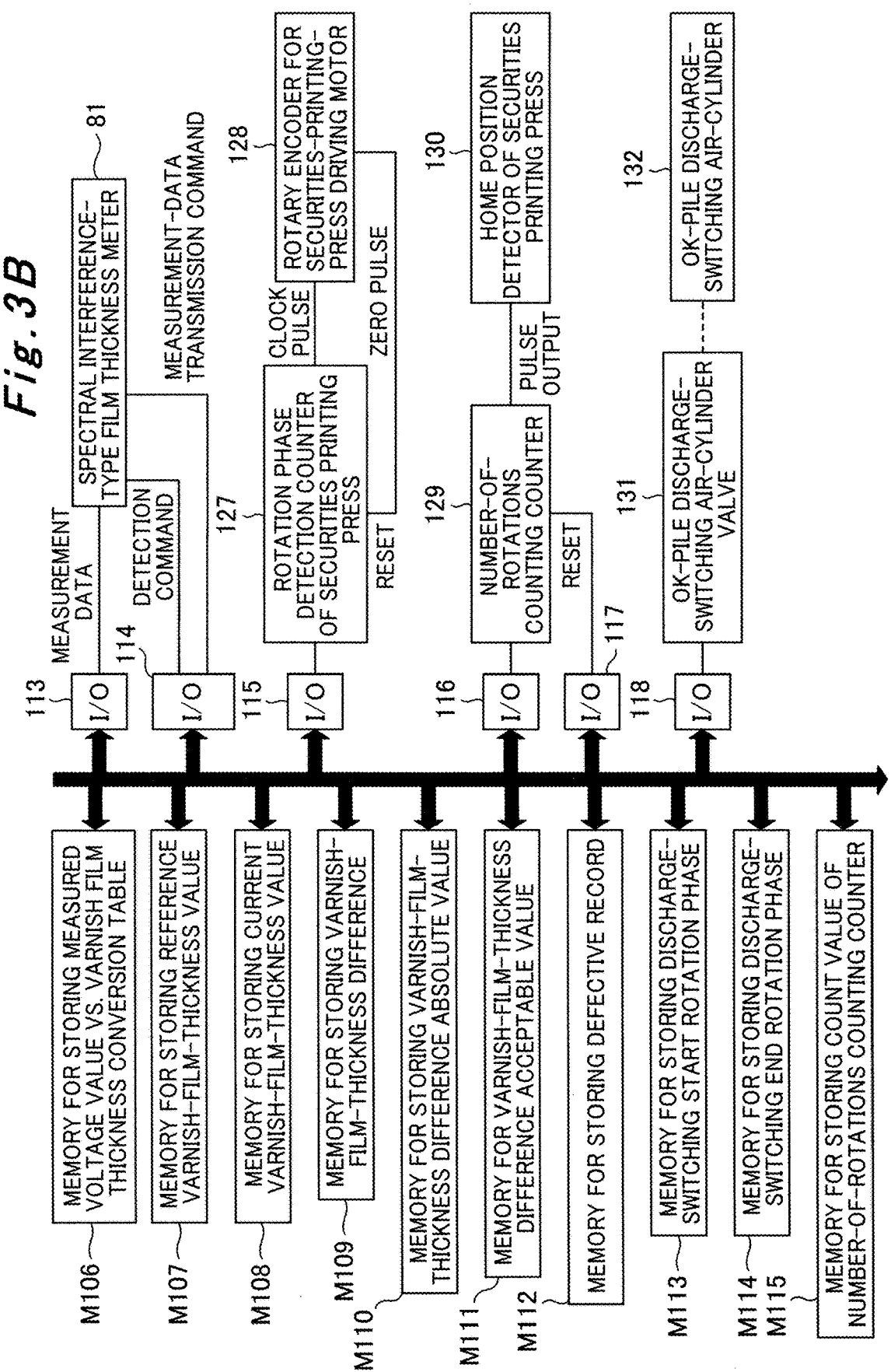

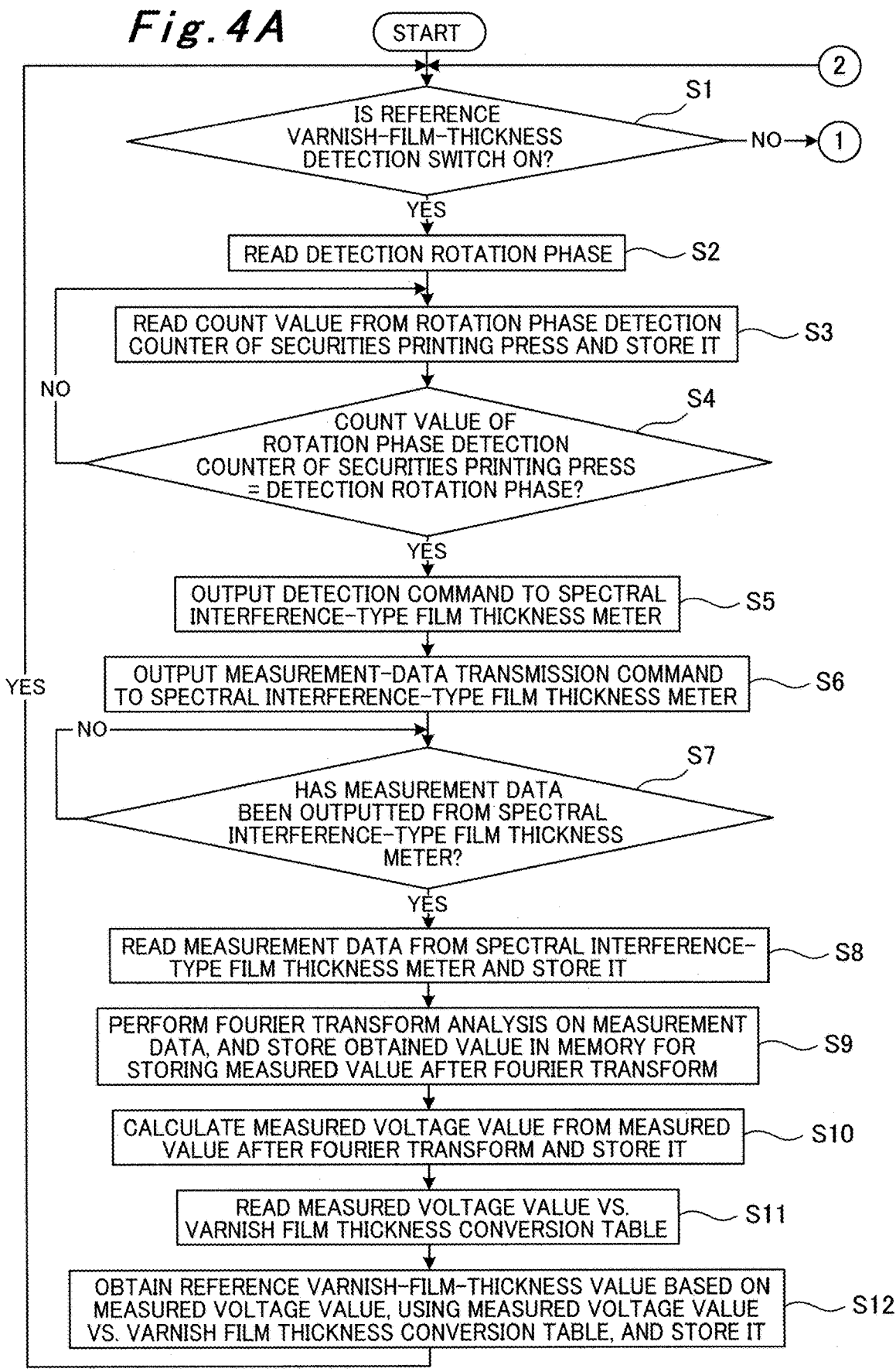

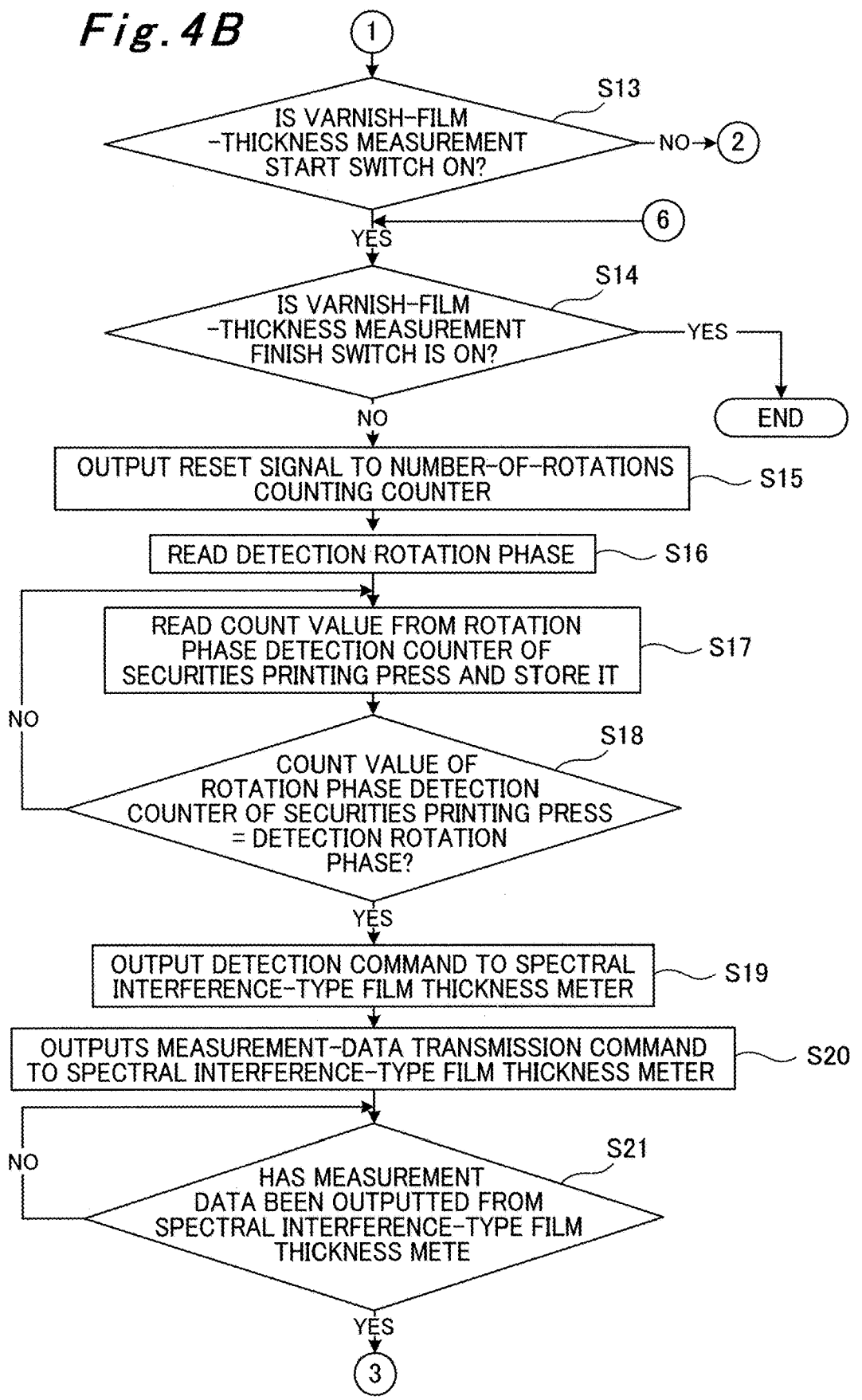

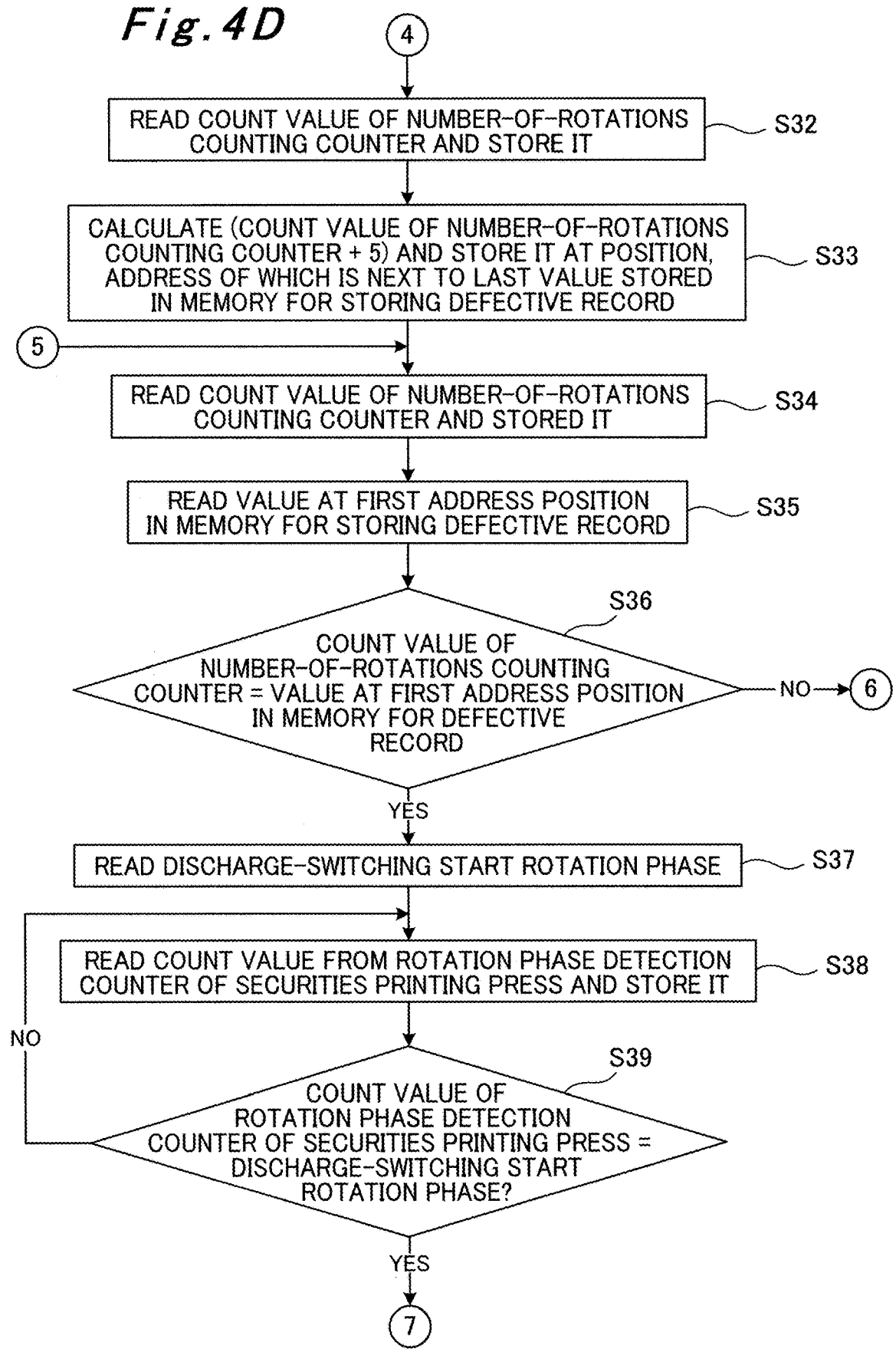

METHOD FOR MEASURING VARNISH FILM THICKNESS OF PRINTED ARTICLE AND VARNISH FILM THICKNESS MEASUREMENT DEVICE

TECHNICAL FIELD

The present invention relates to methods for measuring varnish film thickness of printing products and varnish film thickness measurement devices for measuring the film thickness of varnish coated on printing products.

BACKGROUND ART

Conventionally, there have been known printing presses including a coating device that performs coating by transferring varnish to sheets (printing products) (for example, see the following Patent Document 1).

PRIOR ART DOCUMENT

Patent Document

Patent Document 1: Japanese Patent Application Publication No. 2014-210438

SUMMARY OF THE INVENTION

Problems to be Solved by the Invention

For printing products having a base made of paper, a polymer, or the like on which varnish is coated, in particular, for securities printing products, the film thickness of the coated varnish has been obtained by dividing the total amount of consumed varnish by (the area of the varnish coating per printing product×the number of sheets on which the varnish was coated). Unfortunately, since the varnish film thickness is very thin, the varnish film thickness cannot be calculated accurately until varnish is coated on a large number of printing products.

Thus, to make the failure/no-failure judgement possible, varnish needs to be coated on a large number of printing products. After that, if the varnish coating is judged to be a failure, the large number of printing products on which varnish was coated by then are discarded as wasted paper sheets, which have been producing a large amount of waste.

Here, it is conceivable to use a spectral interference-type film thickness meter to measure the film thickness of varnish on the surface of each printing product. However, there is a problem that in the case where the base of the printing product is paper, since the surface of paper itself is uneven, and in addition, varnish is coated on patterns printed on the surface of the paper with ink, a film thickness including ink is measured when measuring the varnish film thickness, and thus, the film thickness of only varnish cannot be measured accurately.

This problem that the measurement is impossible because of ink also exists in the case where the base is made of a polymer.

In light of such a situation, an object of the present invention is to provide a method for measuring varnish film thickness of printing products and a varnish film thickness measurement device that make it possible to measure the film thickness of varnish coated on the surfaces of the printing products promptly and accurately.

Means for Solving the Problems

A method for measuring varnish film thickness of a printing product according to a first aspect of the present invention to solve the above problem is a method for measuring varnish film thickness of a printing product to obtain varnish film thickness of a printing product in which a pattern is printed on a base of the printing product with ink, and then varnish is coated thereon, characterized in that the method comprising:

attaching metal foil having a smooth surface on a base of a printing product; and detecting film thickness of varnish coated directly on the metal foil, using a noncontact film thickness detection device.

A method for measuring varnish film thickness of a printing product according to a second aspect of the present invention to solve the above problem is characterized in that difference between a reference film thickness set in advance and the varnish film thickness detected by the film thickness detection device is compared to an acceptable value set in advance to make a failure/no-failure judgement on the varnish film thickness.

A method for measuring varnish film thickness of a printing product according to a third aspect of the present invention to solve the above problem is characterized in that the metal foil is a hologram or security thread provided at a pattern portion of the printing product.

A method for measuring varnish film thickness of a printing product according to a fourth aspect of the present invention to solve the above problem is characterized in that the metal foil is attached to a margin of the printing product.

A device for measuring varnish film thickness of a printing product according to a fifth aspect of the present invention to solve the above problem is a device for measuring varnish film thickness of a printing product to obtain varnish film thickness of a printing product in which a pattern is printed on a base of the printing product with ink, and then varnish is coated thereon, characterized in that the device comprising a film thickness detection device that detects, in a non-contact manner, film thickness of varnish coated directly on metal foil that is attached on a base of a printing product and has a smooth surface.

A device for measuring varnish film thickness of a printing product according to a sixth aspect of the present invention to solve the above problem is characterized in that the device comprises a film-thickness measurement unit that compares difference between a reference film thickness set in advance and the varnish film thickness detected by the film thickness detection device to an acceptable value set in advance to make a failure/no-failure judgement on the varnish film thickness.

A device for measuring varnish film thickness of a printing product according to a seventh aspect of the present invention to solve the above problem is characterized in that the metal foil is a hologram or security thread provided at a pattern portion of the printing product.

A device for measuring varnish film thickness of a printing product according to an eighth aspect of the present invention to solve the above problem is characterized in that the metal foil is attached to a margin of the printing product.

Effect of the Invention

A method of measuring varnish film thickness of printing products and a varnish film thickness measurement device according to the present invention make it possible to measure the film thickness of varnish coated on the surfaces of the printing products promptly and accurately.

BRIEF DESCRIPTION OF THE DRAWINGS

FIG. 2 is an explanatory diagram illustrating an example of a sheet.

FIG. 3A is a hardware block diagram illustrating a configuration of a film-thickness measurement unit according to the first embodiment of the present invention.

FIG. 3B is a hardware block diagram illustrating a configuration of the film-thickness measurement unit according to the first embodiment of the present invention.

FIG. 4A is a flowchart illustrating the procedure of processes performed by a film thickness measurement device according to the first embodiment of the present invention.

FIG. 4B is a flowchart illustrating the procedure of processes performed by the film thickness measurement device according to the first embodiment of the present invention.

FIG. 4D is a flowchart illustrating the procedure of processes performed by the film thickness measurement device according to the first embodiment of the present invention.

MODE FOR CARRYING OUT THE INVENTION

First Embodiment

Based on FIGS. 1 to 6, description will be provided for a first embodiment in which a device for measuring the varnish film thickness of printing products according to the present invention is applied to a numbering and imprinting machine.

Figure 1:
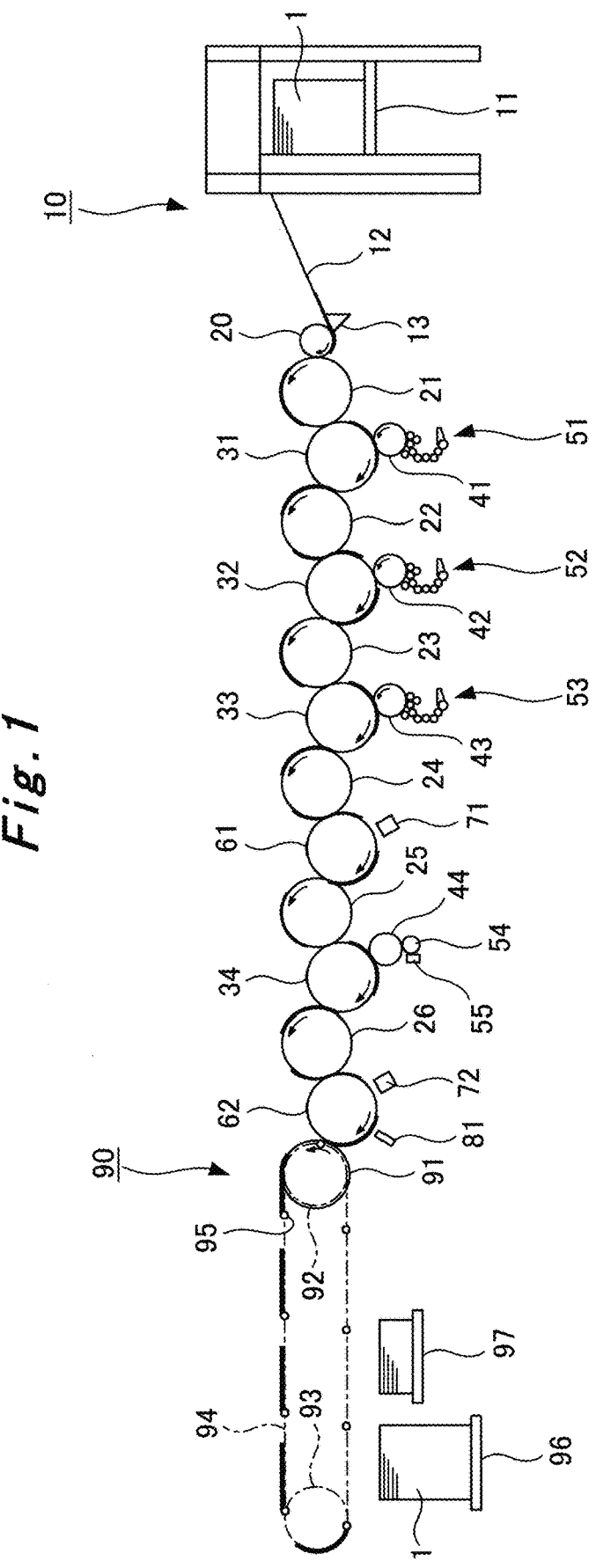
FIG. 1 is an overall schematic configuration diagram of a first embodiment in which a sheet processing device according to the present invention is applied to a numbering and imprinting machine.

As illustrated in FIG. 1, a sheet feeding device 10 that feeds sheets (print articles) 1 having a base made of paper or a polymer has a sheet feeding table 11 on which the sheets 1 are stacked and a feeder board 12 that guides the sheet 1 being fed. The distal end of the feeder board 12 is positioned near what is called a single-diameter transfer cylinder 20 having, on its outer periphery, a set of gripper devices that hold the sheet 1 so as to be capable of throwing it off. Between the distal end of the feeder board 12 and the transfer cylinder 20 is disposed a swing arm shaft pregripper 13 that passes the sheet 1 from the feeder board 12 one by one to the transfer cylinder 20.

The transfer cylinder 20 is in contact with a transfer cylinder 21 with what is called a double-size diameter having two sets of gripper devices on its outer periphery. The transfer cylinder 21 is in contact with an impression cylinder 31 with what is called a double-size diameter having two sets of gripper devices on its outer periphery. The impression cylinder 31 is in contact with a transfer cylinder 22 with what is called a double-size diameter having two sets of gripper devices on its outer periphery. The impression cylinder 31 is in contact with a plate cylinder 41 with what is called a single-size diameter which detachably holds one printing plate on its outer periphery, at a position downstream in the rotation direction of the position where the impression cylinder 31 is in contact with the transfer cylinder 21 and upstream in the rotation direction of the position where the impression cylinder 31 is in contact with the transfer cylinder 22. The plate cylinder 41 is movable to be away from and to be in contact with the impression cylinder 31. At the plate cylinder 41 is disposed an wet ink supply device 51 which supplies wet ink to the printing plate on the plate cylinder 41.

The transfer cylinder 22 is in contact with an impression cylinder 32 with what is called a double-size diameter having two sets of gripper devices on its outer periphery. The impression cylinder 32 is in contact with a transfer cylinder 23 with what is called a double-size diameter having two sets of gripper devices on its outer periphery. The impression cylinder 32 is in contact with a first numbering cylinder 42 with what is called a single-size diameter which has a numbering device on its outer periphery, at a position downstream in the rotation direction of the position where the impression cylinder 32 is in contact with the transfer cylinder 22 and upstream in the rotation direction of the position where the impression cylinder 32 is in contact with the transfer cylinder 23. The first numbering cylinder 42 is movable to be away from and to be in contact with the impression cylinder 32. At the first numbering cylinder 42 is disposed an wet ink supply device 52 which supplies wet ink to the numbering device on the first numbering cylinder 42.

The transfer cylinder 23 is in contact with an impression cylinder 33 with what is called a double-size diameter having two sets of gripper devices on its outer periphery. The impression cylinder 33 is in contact with a transfer cylinder 24 with what is called a double-size diameter having two sets of gripper devices on its outer periphery. The impression cylinder 33 is in contact with a second numbering cylinder 43 with what is called a single-size diameter which has a numbering device on its outer periphery, at a position downstream in the rotation direction of the position where the impression cylinder 33 is in contact with the transfer cylinder 23 and upstream in the rotation direction of the position where the impression cylinder 33 is in contact with the transfer cylinder 24. The second numbering cylinder 43 is movable to be away from and to be in contact with the impression cylinder 33. At the second numbering cylinder 43 is disposed an wet ink supply device 53 which supplies wet ink to the numbering device on the second numbering cylinder 43.

The transfer cylinder 24 is in contact with a drying cylinder 61 with what is called a double-size diameter having two sets of gripper devices on its outer periphery. The drying cylinder 61 is in contact with a transfer cylinder 25 with what is called a double-size diameter having two sets of gripper devices on its outer periphery. At a position downstream in the rotation direction of the position where the drying cylinder 61 is in contact with the transfer cylinder 24 and upstream in the rotation direction of the position where the drying cylinder 61 is in contact with the transfer cylinder 25 is disposed a dryer 71.

The transfer cylinder 25 is in contact with an impression cylinder 34 with what is called a double-size diameter having two sets of gripper devices on its outer periphery. The impression cylinder 34 is in contact with a transfer cylinder 26 with what is called a double-size diameter having two sets of gripper devices on its outer periphery. The impression cylinder 34 is in contact with a coater cylinder 44 with what is called a single-size diameter, at a position downstream in the rotation direction of the position where the impression cylinder 34 is in contact with the transfer cylinder 25 and upstream in the rotation direction of the position where the impression cylinder 34 is in contact with the transfer cylinder 26. The coater cylinder 44 is movable to be away from and to be in contact with the impression cylinder 34. The coater cylinder 44 is in contact with an anilox roller 54 having a large number of dimples on its outer peripheral surface. At the anilox roller 54 is disposed a chamber 55 for supplying varnish to the dimples of the anilox roller 54.

The transfer cylinder 26 is in contact with a drying cylinder 62 with what is called a double-size diameter having two sets of gripper devices on its outer periphery.

The drying cylinder 62 is in contact with a delivery cylinder 91 with what is called a double-size diameter included in a delivery device 90 for discharging the sheet 1. At a position downstream in the rotation direction of the position where the drying cylinder 62 is in contact with the transfer cylinder 26 and upstream in the rotation direction of the position where the drying cylinder 62 is in contact with the delivery cylinder is disposed a dryer 72. In addition, a spectral interference-type film thickness meter 81 is disposed as a noncontact film thickness detection device at a position that is downstream in the rotation direction of the position where the drying cylinder 62 is in contact with the transfer cylinder 26 and upstream in the rotation direction of the position where the drying cylinder 62 is in contact with the delivery cylinder 91 and is also downstream of the dryer 72. The measurement data detected by the spectral interference-type film thickness meter 81 is sent to a varnish-film-thickness measurement unit 100 which is a film-thickness measurement unit described later.

The delivery cylinder 91 is provided with a sprocket 92 coaxially. An endless delivery chain 94 is wound around and engaged with the sprocket 92; the endless delivery chain 94 is also wound around and engaged with a sprocket 93. The delivery chain 94 has multiple gripper bars 95 with gripper devices, attached at predetermined intervals along the longitudinal direction of the delivery chain 94. Below the delivery chain 94 are disposed a delivery table 96 for properly printed paper sheets and a delivery table 97 for wasted paper sheets along the moving direction of the delivery chain 94.

Note that the delivery table 96 for properly printed paper sheets is equipped with an OK-pile discharge-switching air-cylinder 132 (see FIG. 3B) which switches a not-illustrated paper releasing cam between a paper-releasing position and a non paper-releasing position when an OK-pile discharge-switching air-cylinder valve 131 (see FIG. 3B) moves a rod forward or back. The delivery table 97 for wasted paper sheets is equipped with a paper releasing cam which is fixed.

As illustrated in FIGS. 3A and 3B, the varnish-film-thickness measurement unit 100 includes a CPU 101, a ROM 102, a RAM 103, and input-output devices 111 to 118 which are connected to one another with bus lines.

To the bus lines are connected memory M101 for storing detection rotation phases, memory M102 for storing count values of a rotation phase detection counter of a securities printing press, memory M103 for storing measurement data of the spectral interference-type film thickness meter, memory M104 for storing measured values after Fourier transform, and memory M105 for storing measured voltage values.

Also to the bus lines are connected memory M106 for storing a measured voltage value vs. varnish film thickness conversion table, memory M107 for storing a reference varnish-film-thickness value, memory M108 for storing a current varnish-film-thickness value, memory M109 for storing a varnish-film-thickness difference, memory M110 for storing a varnish-film-thickness difference absolute value, memory M111 for a varnish-film-thickness difference acceptable value, memory M112 for storing defective records, memory M113 for storing discharge-switching start rotation phases, memory M114 for storing a discharge-switching end rotation phase, and memory M115 for storing count values of a number-of-rotations counting counter.

Further, the input-output device 111 is connected to an input device 121, such as a keyboard, various switches, or buttons; a display 122, such as a CRT or lamps; and an output device 123, such as a printer.

The input-output device 112 is connected to a reference varnish-film-thickness detection switch 124, varnish-film-thickness measurement start switch 125, and varnish-film-thickness measurement finish switch 126.

The input-output devices 113 and 114 are connected to the spectral interference-type film thickness meter 81. The input-output device 114 sends a detection command and a measurement-data transmission command to the spectral interference-type film thickness meter 81, and the measurement data measured by the spectral interference-type film thickness meter 81 is outputted to the input-output device 113.

In addition, the input-output device 115 is connected to a rotation phase detection counter 127 of the securities printing press, and this rotation phase detection counter 127 of the securities printing press is connected to a rotary encoder 128 for a securities-printing-press driving motor. The rotary encoder 128 for the securities-printing-press driving motor is directly attached, for example, to an rear end portion of the output shaft of the not-illustrated securities-printing-press driving motor. The rotary encoder 128 outputs a zero pulse once for every rotation to reset the rotation phase detection counter 127 of the securities printing press and also outputs a clock pulse to the rotation phase detection counter 127 of the securities printing press for every predetermined rotation angle of the securities-printing-press driving motor.

The input-output devices 116 and 117 are connected to a number-of-rotations counting counter 129 of the securities printing press, which is connected to a home position detector 130 of the securities printing press. The home position detector 130 of the securities printing press outputs one pulse every time the numbering and imprinting machine performs printing on one print sheet W. In addition, the number-of-rotations counting counter 129 of the printing press is also connected to the input-output device 117 and receives an input of a reset signal from the input-output device 117.

The input-output device 118 is connected to the OK-pile discharge-switching air-cylinder valve 131 for moving forward or back the rod of the OK-pile discharge-switching air-cylinder 132 described above.

In the numbering and imprinting machine according to this embodiment, the sheets 1 on the sheet feeding table 11 of the sheet feeding device 10 are fed onto the feeder board 12 one by one. Each sheet is sequentially passed to the transfer cylinder 20 with the swing arm shaft pregripper 13. The sheet is passed on via the transfer cylinder 21 and gripped by the gripper device of the impression cylinder 31 through a gripping change, and the sheet is held on the outer periphery of the impression cylinder 31.

Note that as illustrated in FIG. 2, on each of the sheets 1 stacked on the sheet feeding table 11, metal foil 1c having a smooth surface is attached to the portion (margin) 1b other than the pattern portion 1a in advance by processing/pasting or the like.

Next, wet ink supplied from the wet ink supply device 51 to the plate cylinder 41 is transferred to the sheet 1 held on the outer periphery of the impression cylinder 31, so that a pattern is printed (overprinted) on the sheet 1. Then, the sheet is passed on via the transfer cylinder 22 and gripped by the gripper device of the impression cylinder 32 through a gripping change, and the sheet is held on the outer periphery of the impression cylinder 32.

Next, wet ink supplied from the wet ink supply device 52 to the first numbering cylinder 42 is transferred to the sheet 1 held on the outer periphery of the impression cylinder 32, so that the first number is printed. Then, the sheet is passed on via the transfer cylinder 23 and gripped by the gripper device of the impression cylinder 33 through a gripping change, and the sheet is held on the outer periphery of the impression cylinder 33.

Next, wet ink supplied from the wet ink supply device 53 to the second numbering cylinder 43 is transferred to the sheet 1 held on the impression cylinder 33, so that the second number is printed. Then, the sheet is passed on via the transfer cylinder 24 and gripped by the gripper device of the drying cylinder 61 through a gripping change, and the sheet is held on the outer periphery of the drying cylinder 61.

Next, the wet ink transferred to the sheet 1 held on the outer periphery of the drying cylinder 61 is heated and dried by the dryer 71. Then, the sheet is passed on via the transfer cylinder 25 and gripped by the gripper device of the impression cylinder 34 through a gripping change, and the sheet is held on the outer periphery of the impression cylinder 34.

Next, varnish supplied from the inside of the chamber 55 via the anilox roller 54 to the coater cylinder 44 is coated on the sheet 1 held on the outer periphery of the impression cylinder 34. Then, the sheet is passed on via the transfer cylinder 26 and gripped by the gripper device of the drying cylinder 62 through a gripping change, and the sheet is held on the outer periphery of the drying cylinder 62.

Next, the varnish transferred to the sheet 1 held on the outer periphery of the drying cylinder 62 is heated and dried by the dryer 72. Then, using the spectral interference-type film thickness meter 81, the film thickness of the varnish coated on the metal foil 1c attached to the sheet 1 is measured. After that, the sheet 1 is passed on via the delivery cylinder 91 of the delivery device 90 and gripped by the gripper device of the gripper bar 95 through a gripping change, and the sheet 1 is conveyed along with the transport movement of the delivery chain 94 driven by the rotation of the sprockets 92 and 93.

Then, the sheet 1 held by the gripper bar 95 and being conveyed is delivered onto the delivery table 96 for properly printed paper sheets or the delivery table 97 for wasted paper sheets according to the failure/no-failure judgement on the varnish film thickness by the film-thickness measurement unit 100.

Hereinafter, based on the flowchart illustrated in FIGS. 4A to 4E, description will be provided in detail for the process of the varnish film thickness measurement using the film-thickness measurement unit 100.

In this embodiment, the film-thickness measurement unit 100 judges at step S1 whether the reference varnish-film-thickness detection switch 124 is on. If the reference varnish-film-thickness detection switch 124 is off (NO), the process moves to step S13 described later. If the reference varnish-film-thickness detection switch 124 is on (YES), the detection rotation phase is read from memory M101 at step S2, the count value is read from the rotation phase detection counter 127 of the securities printing press at step S3, and this is stored in memory M102.

Following step S3, it is judged at step S4 whether the count value of the rotation phase detection counter 127 of the securities printing press agrees with the detection rotation phase. If the count value of the rotation phase detection counter 127 of the securities printing press does not agree with the detection rotation phase (NO), it is judged that the metal foil 1c has not reached the position facing the spectral interference-type film thickness meter 81, and the process returns to step S3. When the count value of the rotation phase detection counter 127 of the securities printing press agrees with the detection rotation phase (YES), it is judged that the metal foil 1c has reached the position facing the spectral interference-type film thickness meter 81, the input-output device 114 outputs a detection command to the spectral interference-type film thickness meter 81 at step S5, and then, the input-output device 114 outputs a measurement-data transmission command to the spectral interference-type film thickness meter 81 at step S6. With this operation, the spectral interference-type film thickness meter 81 measures the film thickness of the varnish coated on the metal foil 1c attached to the sheet 1, and outputs the measurement data to the input-output device 113.

Next, at step S7, if the measurement data has not been outputted from the spectral interference-type film thickness meter 81 to input-output device 113 (NO), the process at step S7 is repeated. When the measurement data is outputted from the spectral interference-type film thickness meter 81 to input-output device 113 (YES), the measurement data is read from the spectral interference-type film thickness meter 81 at step S8 and stored in memory M103. Next, the measurement data is subjected to Fourier transform analysis at step S9, and the value obtained from the analysis is stored in memory M104 which is for storing measured values after Fourier transform.

Next, the measured voltage value is calculated from the measured value after Fourier transform at step S10, and the result is stored in memory M105. At step S11, the measured voltage value vs. varnish film thickness conversion table is read from memory M106. Using the measured voltage value vs. varnish film thickness conversion table, the reference varnish-film-thickness value is obtained based on the measured voltage value at step S12 and stored in memory M107. Then, the process returns to step S1.

In summary, through steps S1 to S12, the film thickness of varnish properly coated on the sheet 1 is obtained and set as a reference value of the varnish film thickness.

At step S13, it is judged whether the varnish-film-thickness measurement start switch 125 is on. If the varnish-film-thickness measurement start switch 125 is off (NO), the process returns to step S1. When the varnish-film-thickness measurement start switch 125 turns on (YES), the process moves to step S14.

At step S14, it is judged whether the varnish-film-thickness measurement finish switch 126 is on. If the varnish-film-thickness measurement finish switch 126 is on (YES), the film thickness measurement ends. If the varnish-film-thickness measurement finish switch 126 is off (NO), the input-output device 117 outputs a reset signal to the number-of-rotations counting counter 129 at step S15. Then, the detection rotation phase is read from memory M101 at step S16, and the count value is read from the rotation phase detection counter 127 of the securities printing press at step S17 and stored in memory M102.

Next, at step S18, if the count value of the rotation phase detection counter 127 of the securities printing press does not agree with the detection rotation phase (NO), it is judged that the metal foil 1c has not reached the position facing the spectral interference-type film thickness meter 81, and the process returns to step S17. When the count value of the rotation phase detection counter 127 of the securities printing press agrees with the detection rotation phase (YES), it is judged that the metal foil 1c has reached the position facing the spectral interference-type film thickness meter 81. The input-output device 114 outputs a detection command to the spectral interference-type film thickness meter 81 at step S19, and then, the input-output device 114 outputs a measurement-data transmission command to the spectral interference-type film thickness meter 81 at step S20.

Next, at step S21, if the measurement data has not been outputted from the spectral interference-type film thickness meter 81 to the input-output device 113 (NO), the process at step S21 is repeated. When the measurement data is outputted from the spectral interference-type film thickness meter 81 to the input-output device 113 (YES), the process moves to step S22.

At step S22, the measurement data is read from the spectral interference-type film thickness meter 81 and stored in memory M103. Next, the measurement data is subjected to Fourier transform analysis at step S23, and the value obtained from the analysis is stored in memory M104 which is for storing measured values after Fourier transform. The measured voltage value is calculated from the measured value after Fourier transform at step S24, and the result is stored in memory M105.

Next, at step S25, the measured voltage value vs. varnish film thickness conversion table is read from memory M106. Using the measured voltage value vs. varnish film thickness conversion table, the current varnish-film-thickness value is obtained based on the measured voltage value at step S26 and stored in memory M108.

Next, at step S27, the reference varnish-film-thickness value is read from memory M107. At step S28, the reference varnish-film-thickness value is subtracted from the current varnish-film-thickness value to calculate the varnish film thickness difference, which is stored in memory M109. At step S29, from the varnish film thickness difference, the varnish-film-thickness difference absolute value is calculated and stored in memory M110. At step S30, the varnish-film-thickness difference acceptable value is read from memory M111.

Next, at step S31, if the varnish-film-thickness difference absolute value is lower than or equal to the varnish-film-thickness difference acceptable value (NO), it is judged that the varnish film thickness is normal (OK), and the process moves to step S34 described later. If the varnish-film-thickness difference absolute value is larger than the varnish-film-thickness difference acceptable value (YES), it is judged that the varnish film thickness is defective (no good), the process moves to step S32.

At step S32, the count value of the number-of-rotations counting counter 129 is read and stored in memory M115. Next, (the count value of the number-of-rotations counting counter+5), which is the timing when the sheet 1 judged to be defective at step S33 reaches the delivery table 96 for properly printed paper sheets, is calculated and stored in memory M112 for storing defective records at the position the address of which is next to the last value stored in the memory M112 for storing defective records.

Figure 5:
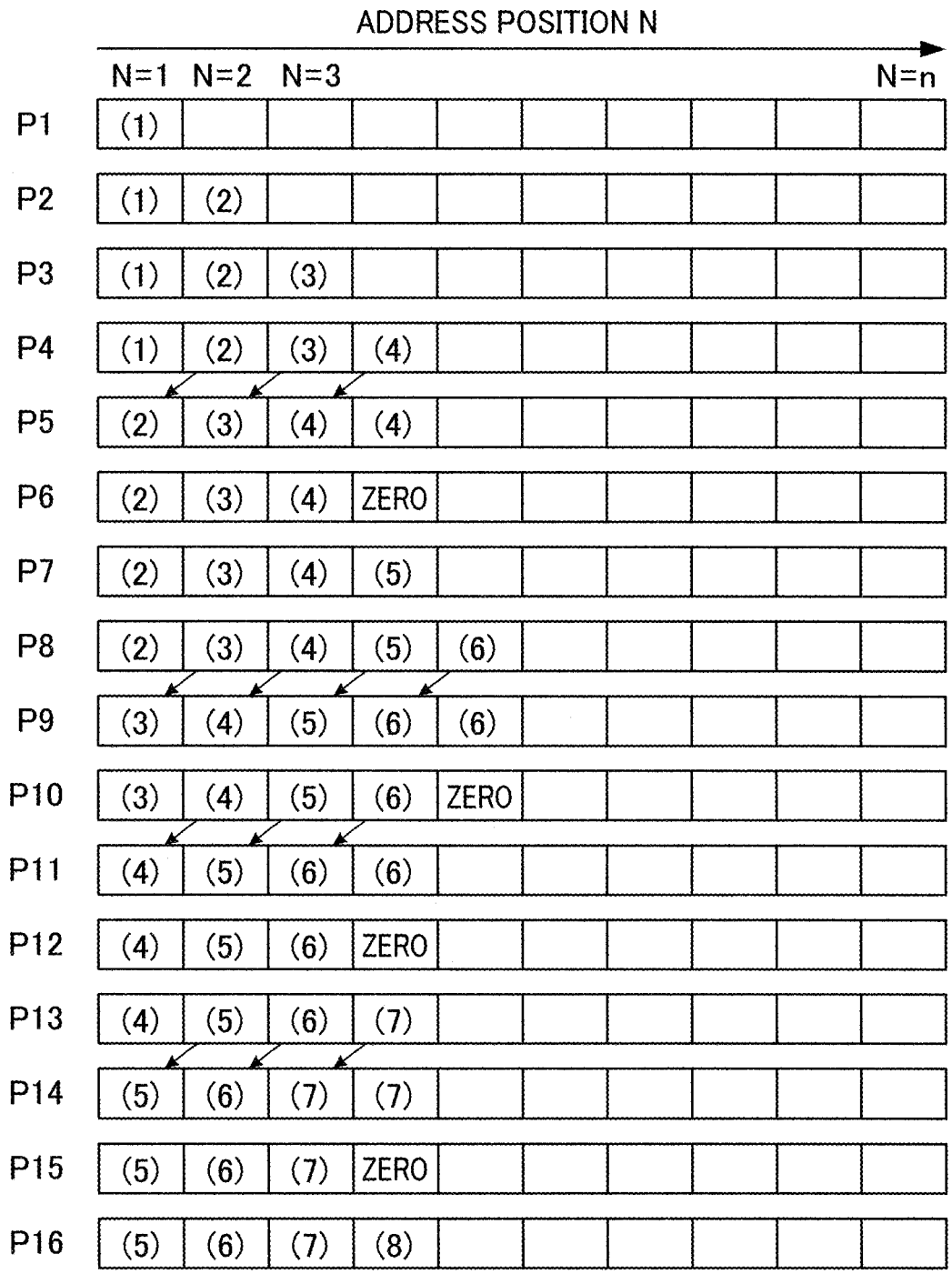
FIG. 5 is an explanatory diagram illustrating the operation of a memory for storing defective records illustrated in FIG. 3B.

For example, as illustrated in FIG. 5, in the case where a defective sheet 1 is detected for the first time after the varnish-film-thickness measurement starts, the value of (the count value of the number-of-rotations counting counter+5) is stored at the first address position (N=1) as the first value (1), as P1 indicates. In the case where the last value stored in memory M112 for storing defective records is at the first address position, the value of (the count value of the number-of-rotations counting counter+5) is stored, as P2 indicates, at the second address position (N=2) as the next value (2).

Next, at step S34, the count value of the number-of-rotations counting counter 129 is read and stored in memory M115. At step S35, the value at the first address position in memory M112 for storing defective records is read. For example, if the values stored in memory M112 for storing defective records are in one of the states indicated by P1 to P4, the value (1) is read. If the values are in one of the states indicated by P5 to P8, the value (2) is read.

Next, at step S36, if the count value of the number-of-rotations counting counter 129 does not agree with the value at the first address position in memory M112 for storing defective records (NO), it is judged that the sheet 1 judged to be defective has not reached the delivery table 96 for properly printed paper sheets, and the process returns to step S14. When the count value of the number-of-rotations counting counter 129 agrees with the value at the first address position in memory M112 for storing defective records (YES), it is judged that the sheet 1 judged to be defective has reached the delivery table 96 for properly printed paper sheets, the discharge-switching start rotation phase is read from memory M113 at step S37. Next, at step S38, the count value is read from the rotation phase detection counter 127 of the securities printing press and stored in memory M102.

Next, at step S39, if the count value of the rotation phase detection counter 127 of the securities printing press does not agree with the discharge-switching start rotation phase (NO), the process returns to step S38. If the count value of the rotation phase detection counter 127 of the securities printing press agrees with the discharge-switching start rotation phase (YES), the process moves to step S40.

At step S40, a non-discharge command is outputted to the OK-pile discharge-switching air-cylinder valve 131. With this operation, the paper releasing cam of the delivery table 96 for properly printed paper sheets is switched to the non paper-releasing position. The gripper device gripping the sheet 1 judged to be defective passes over the delivery table 96 for properly printed paper sheets, then passes by the fixed paper releasing cam above the delivery table 97 for wasted paper sheets, and releases the sheet 1 through a gripping change by the gripper device. With this operation, the sheet 1 judged to be defective is placed on the delivery table 97 for wasted paper sheets.

Next, at step S41, the discharge-switching end rotation phase is read from memory M114. At step S42, the count value is read from the rotation phase detection counter 127 of the securities printing press and stored in memory M102.

Next, at step S43, if the count value of the rotation phase detection counter 127 of the securities printing press does not agree with the discharge-switching end rotation phase (NO), the process returns to step S42. If the count value of the rotation phase detection counter 127 of the securities printing press agrees with the discharge-switching end rotation phase (YES), the process moves to step S44.

At step S44, the input-output device 118 outputs a discharge command to the OK-pile discharge-switching air-cylinder valve 131. With this operation, the paper releasing cam of the delivery table 96 for properly printed paper sheets is switched to the paper-releasing position.

Next, at step S45, along with discharging the sheet 1 the record of which is stored at the first address position in memory M112 for storing defective records, the value stored at the (N+1) address position in memory M112 for storing defective records is overwritten at the N address position, as indicated by the changes from P4 to P5, from P8 to P9, from P10 to P11, and from P13 to P14 in FIG. 5 (where N=1, 2, . . . , n).

Following step S45, at step S46, zero is overwritten at the address position of the last value stored in memory M112 for storing defective records to perform initialization, as indicated by the changes from P5 to P6, from P9 to P10, from P11 to P12, and from P14 to P15 in FIG. 5, and the process returns to step S14.

In summary, through steps S13 to S46, the film thickness of the varnish coated on the metal foil 1c attached to the sheet 1 is measured, and this varnish film thickness is compared to the reference varnish film thickness to make a failure/no-failure judgement. The sheet 1 in which the varnish film thickness has been judged to be normal is discharged onto the delivery table 96 for properly printed paper sheets, while the sheet 1 in which the varnish film thickness has been judged to be defective is discharged onto the delivery table 97 for wasted paper sheets.

The device for measuring the varnish film thickness of printing products, according to this embodiment described above uses the spectral interference-type film thickness meter 81 to measure the film thickness of varnish, which is coated on the metal foil 1c having a smooth surface and attached by processing/pasting or the like to the surface of the margin 1c of the sheet 1 having a base made of paper or a polymer and then cured by the dryer 72, making it possible to measure the varnish film thickness promptly and accurately. The device for measuring the varnish film thickness of printing products, according to this embodiment uses the film thickness of the varnish that was favorably coated as a reference film thickness to judge whether the varnish film thickness being inspected is within the acceptable value with respect to the reference film thickness, making it possible to perform a failure/no-failure judgement on the varnish film thickness with high accuracy.

In addition, since the metal foil 1c is attached to the margin 1b of the sheet 1, and the film thickness of the varnish coated on the metal foil 1c is measured, the varnish film thickness can be measured accurately even when the printing product has a pattern 1a on the entire area of the sheet 1.

Figure 6:
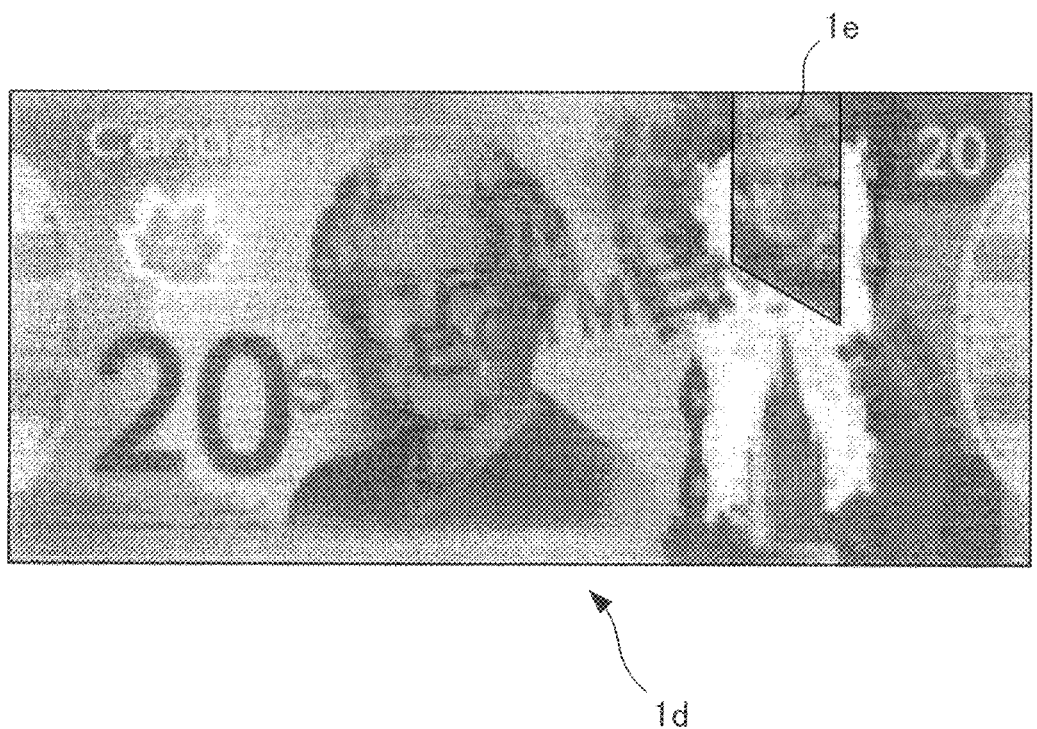
FIG. 6 is an explanatory diagram illustrating an example of the pattern of a sheet.

Note that although the above embodiment illustrates an example in which the metal foil 1c is attached to the margin 1b of the sheet 1 in advance, the present invention is not limited to the above embodiment. For example, as illustrated in FIG. 6, in the case where the pattern 1d of the sheet 1 has a portion where the metal foil 1e having smooth surface, such as a hologram, a security thread, or the like often used for bank notes or the like, is exposed (a portion where no pattern is printed with ink on the metal foil 1e), the film thickness of the varnish coated on that portion may be measured. This makes it possible to utilize the pattern 1d printed on the sheet 1 to measure the varnish film thickness accurately, eliminating the need for attaching an additional metal foil to the sheet 1. Note that in the case of what is called multi-page imposition printing in which multiple patterns 1d are simultaneously printed, the film thickness of the varnish coated on the metal foil 1e attached to any one of the patterns 1d may be measured, or the film thickness of the varnish coated on the metal foil 1e attached to multiple patterns 1d may be measured.

In addition, although the above embodiment described an example in which the metal foil 1c is attached to one place of the margin 1b of the sheet 1, the metal foil 1c may be attached to two or more places in one sheet 1, and the film thickness of the varnish on each pieces of the metal foil 1c may be measured, for example.

Second Embodiment

Figure 7:
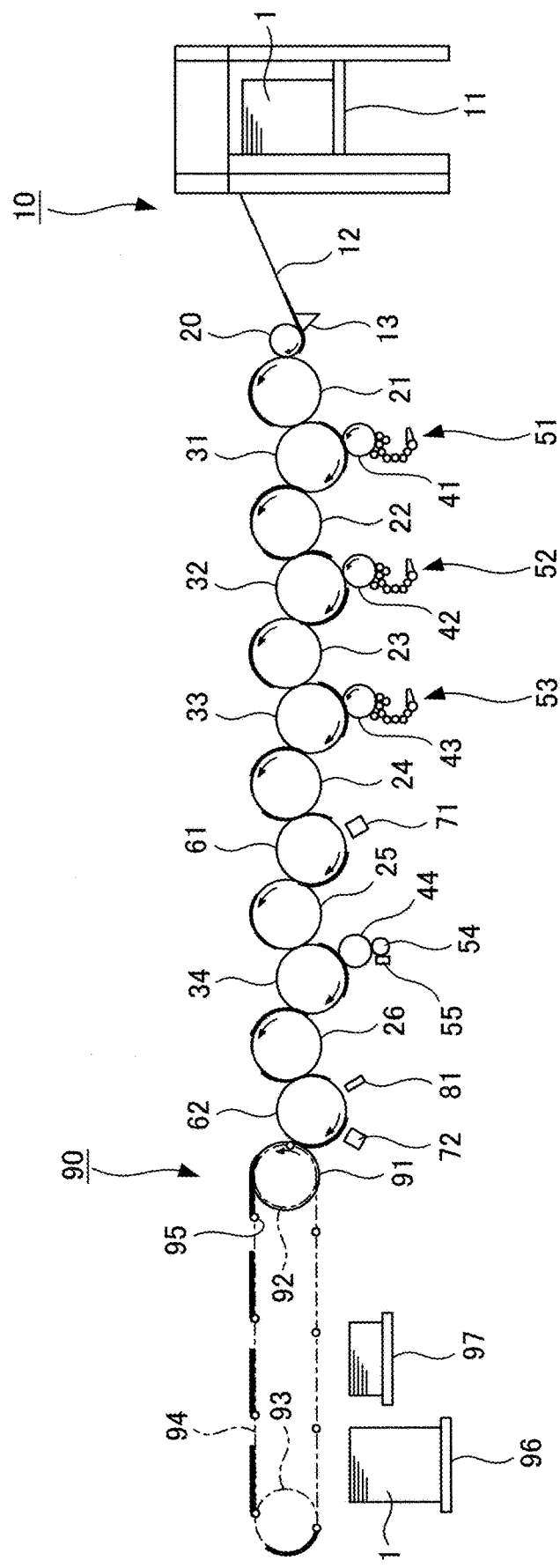
FIG. 7 is an overall schematic configuration diagram of a second embodiment in which a sheet processing device according to the present invention is applied to a numbering and imprinting machine.

Based on FIG. 7, description will be provided for a second embodiment in which a device for measuring the varnish film thickness of printing products, according to the present invention is applied to a numbering and imprinting machine.

As illustrated in FIG. 7, in this embodiment, the arrangement of the dryer 72 and the spectral interference-type film thickness meter 81 is different from that in the first embodiment described above. Specifically, the dryer 72 is disposed at a position downstream in the rotation direction of the position where the drying cylinder 62 is in contact with the transfer cylinder 26 and upstream in the rotation direction of the position where the drying cylinder 62 is in contact with the delivery cylinder 91, and the spectral interference-type film thickness meter 81 is disposed at a position that is downstream in the rotation direction of the position where the drying cylinder 62 is in contact with the transfer cylinder 26 and upstream in the rotation direction of the position where the drying cylinder 62 is in contact with the delivery cylinder 91 and is also upstream of the dryer 72.

The other structure, and the process in terms of the varnish film thickness measurement using the film-thickness measurement unit 100 are the same as those in the first embodiment, and thus repetitive description thereof is omitted.

In this embodiment, the numbering and imprinting machine performs printing, varnish coating, and delivery as in the first embodiment, but unlike the first embodiment, the film thickness of the varnish on the metal foil 1c attached to the sheet 1 is measured using the spectral interference-type film thickness meter 81 after varnish is coated on the sheet 1 and before this varnish is heated and dried by the dryer 72.

Figure 4C:
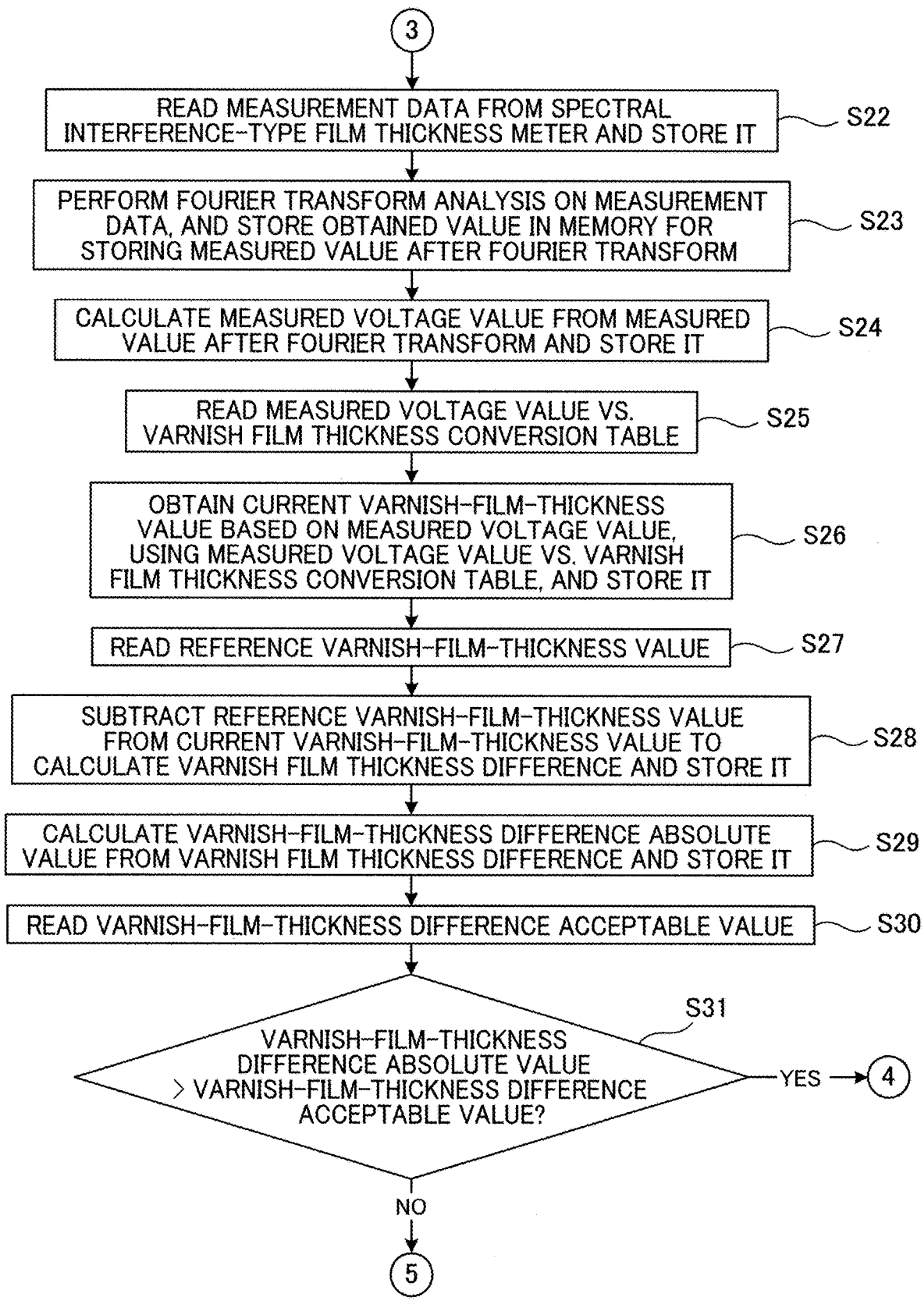
FIG. 4C is a flowchart illustrating the procedure of processes performed by the film thickness measurement device according to the first embodiment of the present invention.
Figure 4E:
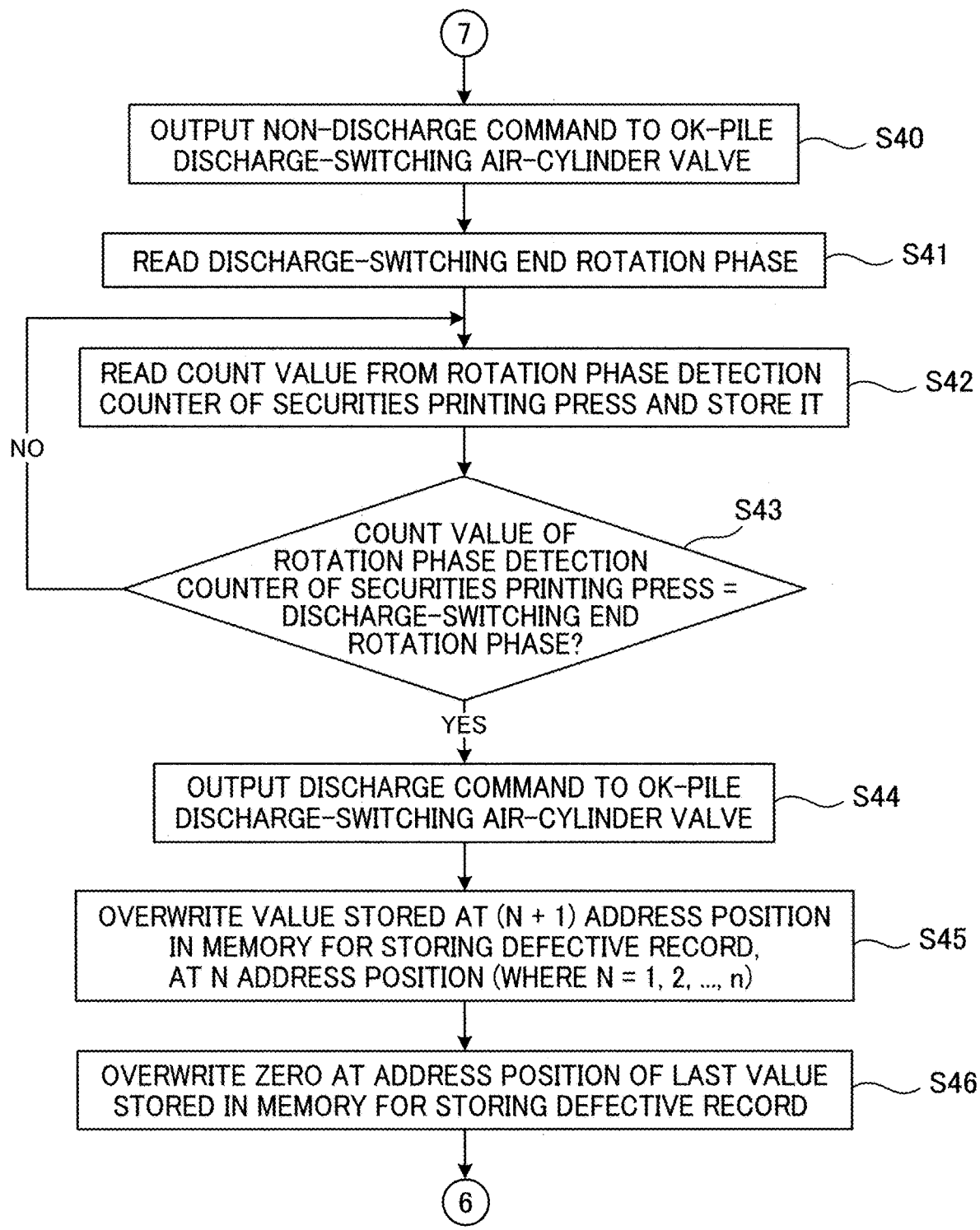
FIG. 4E is a flowchart illustrating the procedure of processes performed by the film thickness measurement device according to the first embodiment of the present invention.

Specifically, in this embodiment, through steps S1 to S12 illustrated in FIG. 4A, the film thickness of the varnish properly coated on the sheet 1, before being heated and dried by the dryer 72, is set as a reference varnish film thickness. Through steps S13 to step S46 illustrated in FIGS. 4B to 4E, the film thickness of the varnish coated on the metal foil 1c attached to the sheet 1, before being heated and dried by the dryer 72, (the current varnish film thickness) is measured, and the current varnish film thickness is compared to the reference varnish film thickness to make a failure/no-failure judgement on the current varnish film thickness. The sheet 1 in which the varnish film thickness has been judged to be normal is discharged onto the delivery table 96 for properly printed paper sheets, while the sheet 1 in which the varnish film thickness has been judged to be defective is discharged onto the delivery table 97 for wasted paper sheets.

Thus, in the method for measuring varnish film thickness of printing products and the varnish film thickness measurement device according to this embodiment, the film thickness of the varnish coated on the metal foil 1c, before being cured by the dryer 72, is measured using the spectral interference-type film thickness meter 81, making it possible to measure the varnish film thickness promptly and accurately. In addition, the film thickness of varnish that was favorably coated is used as a reference film thickness, and the difference between this reference film thickness and the varnish film thickness newly measured is compared to an acceptable value set in advance to make an OK/no-good judgment, making it possible to perform a failure/no-failure judgement on the varnish film thickness with high accuracy as in the first embodiment.

INDUSTRIAL APPLICABILITY

The present invention can be used for methods for measuring varnish film thickness of printing products and varnish film thickness measurement devices.

REFERENCE SIGNS LIST 1 sheet
1a, 1d pattern
1b margin
1c, 1e metal foil
10 sheet feeding device
11 sheet feeding table
12 feeder board
13 swing arm shaft pregripper
20 to 26 transfer cylinder
31 to 34 impression cylinder
41 plate cylinder
42 first numbering cylinder
43 second numbering cylinder
44 coater cylinder
51 to 53 wet ink supply device
54 anilox roller
55 chamber
61, 62 drying cylinder
71, 72 dryer
81 spectral interference-type film thickness meter
90 delivery device
91 delivery cylinder
92, 93 sprocket
94 delivery chain
95 gripper bar
96, 97 delivery table
100 film-thickness measurement unit
101 CPU
102 ROM
103 RAM
111 to 118 input-output device
121 input device
122 display
123 output device
124 reference varnish-film-thickness detection switch
125 varnish-film-thickness measurement start switch
126 varnish-film-thickness measurement finish switch
127 rotation phase detection counter of securities printing press
128 rotary encoder for securities-printing-press driving motor
129 number-of-rotations counting counter
130 home position detector of securities printing press
131 OK-pile discharge-switching air-cylinder valve
132 OK-pile discharge-switching air-cylinder
M101 to M115 memory

The invention claimed is:

1. A method for measuring varnish film thickness of a printing product to obtain varnish film thickness of a printing product in which a pattern is printed on a base of the printing product with ink, and then varnish is coated thereon, wherein the method comprising:
    attaching a metal foil having a smooth surface on the base of the printing product;
    printing the pattern on the base with the ink so that the metal foil is exposed;
    coating the varnish on the base on which the metal is attached and the pattern is printed; and
    detecting film thickness of varnish coated directly on a portion, where the pattern is not printed with the ink, of the metal foil, using a noncontact film thickness detection device.

2. The method for measuring varnish film thickness of a printing product according to claim 1, wherein
    difference between a reference film thickness set in advance and the varnish film thickness detected by the film thickness detection device is compared to an acceptable value set in advance to make a failure/no-failure judgement on the varnish film thickness.

3. The method for measuring varnish film thickness of a printing product according to claim 2, wherein
    the metal foil is a hologram or security thread provided at a pattern portion of the printing product.

4. The method for measuring varnish film thickness of a printing product according to claim 2, wherein
    the metal foil is attached to a margin of the printing product.

5. The method for measuring varnish film thickness of a printing product according to claim 1, wherein
    the metal foil is a hologram or security thread provided at a pattern portion of the printing product.

6. The method for measuring varnish film thickness of a printing product according to claim 1, wherein
    the metal foil is attached to a margin of the printing product.

7. A device for measuring varnish film thickness of a printing product to obtain varnish film thickness of a printing product in which a pattern is printed on a base of the printing product with ink, and then varnish is coated thereon, wherein the device comprising:
    a cylinder configured to hold the printing product, wherein the printing product includes a metal foil that is attached on the base of the printing product and has a smooth surface, and the pattern is printed on the base with the ink so that the metal foil is exposed;
    a spectral interference-type film thickness meter arranged so as to face the cylinder; and
    a film-thickness measurement unit including a CPU and configured to determine if the metal foil of the printing product on the cylinder has reached a position facing the spectral interference-type film thickness meter, and make when it is determined that the metal foil has reached the position, the spectral interference-type film thickness meter measure film thickness of the varnish to detect the film thickness of the varnish coated directly on a portion, where the pattern is not printed with the ink, of the metal foil.

8. The device for measuring varnish film thickness of a printing product according to claim 7, wherein the film-thickness measurement unit is configured to compare difference between a reference film thickness set in advance and the varnish film thickness measured by the spectral interference-type film thickness meter to an acceptable value set in advance to make a failure/no-failure judgement on the varnish film thickness.

9. The device for measuring varnish film thickness of a printing product according to claim 8, wherein the metal foil is a hologram or security thread provided at a pattern portion of the printing product.

10. The device for measuring varnish film thickness of a printing product according to claim 8, wherein the metal foil is attached to a margin of the printing product.

11. The device for measuring varnish film thickness of a printing product according to claim 7, wherein the metal foil is a hologram or security thread provided at a pattern portion of the printing product.

12. The device for measuring varnish film thickness of a printing product according to claim 7, wherein the metal foil is attached to a margin of the printing product.

* * * * *